(12) United States Patent
Yeh

(10) Patent No.: US 11,774,729 B2
(45) Date of Patent: Oct. 3, 2023

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventor: Ching-Chung Yeh, Taichung (TW)

(73) Assignees: SINTAI OPTICAL (SHENZHEN) CO., LTD., Shenzhen (TW); ASIA OPTICAL CO., INC., Taichung (TW)

( * ) Notice: Subject to any disclaimer, the term of this patent is extended or adjusted under 35 U.S.C. 154(b) by 421 days.

(21) Appl. No.: 17/093,895

(22) Filed: Nov. 10, 2020

(65) Prior Publication Data
US 2021/0181486 A1    Jun. 17, 2021

(30) Foreign Application Priority Data
Dec. 11, 2019 (CN) .......................... 201911262812.2

(51) Int. Cl.
  *G02B 13/06* (2006.01)
  *G02B 9/64* (2006.01)
  *G02B 13/18* (2006.01)
(52) U.S. Cl.
  CPC .............. *G02B 13/06* (2013.01); *G02B 9/64* (2013.01); *G02B 13/18* (2013.01)
(58) Field of Classification Search
  CPC .......... G02B 13/06; G02B 9/64; G02B 13/18; G02B 13/0045; G02B 13/006; G02B 15/145525
  See application file for complete search history.

(56) References Cited

U.S. PATENT DOCUMENTS

| 9,939,611 | B2 | 4/2018 | Chang et al. |
| 9,989,732 | B1 * | 6/2018 | Fu .......................... G02B 13/06 |

(Continued)

FOREIGN PATENT DOCUMENTS

| CN | 207704133 U | 8/2018 |
| CN | 208110148 U | 11/2018 |

(Continued)

OTHER PUBLICATIONS

Herbert Gross et al., Handbook of Optical Systems, 2007, Wiley-VCH, vol. 3, p. 377 (Year: 2007).*

(Continued)

*Primary Examiner* — William Choi
*Assistant Examiner* — Ray Alexander Dean
(74) *Attorney, Agent, or Firm* — McClure, Qualey & Rodack, LLP

(57) ABSTRACT

A wide-angle lens assembly includes a first, second, third, fourth, fifth, sixth, seventh, eighth, and ninth lenses. The first and second lenses are with negative refractive power and include a convex surface facing an object side and a concave surface facing an image side respectively. The third lens is a biconcave lens with negative refractive power. The fourth and fifth lenses are biconvex lenses with positive refractive power. The sixth lens is with positive refractive power and includes a convex surface facing the image side. The seventh lens is with negative refractive power and includes a concave surface facing the object side. The eighth lens is with positive refractive power and includes a convex surface facing the object side. The ninth lens is with positive refractive power and includes a concave surface facing the object side and a convex surface facing the image side.

17 Claims, 12 Drawing Sheets

(56) References Cited

U.S. PATENT DOCUMENTS

| | | | |
|---|---|---|---|
| 2008/0074756 A1* | 3/2008 | Yamamoto | G02B 15/1455 |
| | | | 359/676 |
| 2010/0265596 A1 | 10/2010 | Su et al. | |
| 2018/0113286 A1* | 4/2018 | Minefuji | G02B 7/10 |

FOREIGN PATENT DOCUMENTS

| | | | |
|---|---|---|---|
| CN | 208672899 U | | 3/2019 |
| CN | 210348046 U | * | 4/2020 |
| JP | 201666059 A | | 4/2016 |
| JP | 2019105696 A | | 6/2019 |
| TW | 201405163 A | | 2/2014 |
| TW | M537665 U | | 3/2017 |

OTHER PUBLICATIONS

CN-210348046_Description_English (Machine Translation), (Xianmen Leading Optics Co LTD), Apr. 17, 2020, Various Screenshots in OA (Year: 2023).*

Nasim Masurov, What is field Curvature, 2020, PhotographyLife (Year: 2020).*

\* cited by examiner

WIDE-ANGLE LENS ASSEMBLY

BACKGROUND OF THE INVENTION

Field of the Invention

The invention relates to a wide-angle lens assembly.

Description of the Related Art

The field of view of today's wide-angle lens assembly is getting larger and larger. Although it is able to capture very wide image, but there will be a phenomenon that the closer to the periphery, the smaller the image. Furthermore, with different application requirement, it is necessary to capture visible light image during the day and infrared light image at night. However, the known wide-angle lens assembly cannot maintain the image quality of visible light and infrared light with good optical performance simultaneously. Therefore, the wide-angle lens assembly needs a new structure in order to meet the above requirement at the same time.

BRIEF SUMMARY OF THE INVENTION

The invention provides a wide-angle lens assembly to solve the above problems. The wide-angle lens assembly of the invention is provided with characteristics of an increased field of view, an increased periphery image, a maintained image quality of visible light and infrared light with good optical performance simultaneously, a resisted environmental temperature change, and still has a good optical performance.

The wide-angle lens assembly in accordance with an exemplary embodiment of the invention includes a first, second, third, fourth, fifth, sixth, seventh, eighth, and ninth lenses, all of which are arranged in order from an object side to an image side along an optical axis. The first and second lenses are with negative refractive power and include a convex surface facing the object side and a concave surface facing the image side respectively. The third lens is a biconcave lens with negative refractive power. The fourth and fifth lenses are biconvex lenses with positive refractive power. The sixth lens is with positive refractive power and includes a convex surface facing the image side. The seventh lens is with negative refractive power and includes a concave surface facing the object side. The eighth lens is with positive refractive power and includes a convex surface facing the object side. The ninth lens is with positive refractive power and includes a concave surface facing the object side and a convex surface facing the image side.

In another exemplary embodiment, the wide-angle lens assembly further includes a stop disposed between the fifth lens and the sixth lens, wherein the sixth lens is cemented with the seventh lens.

In yet another exemplary embodiment, the sixth lens further includes another convex surface facing the object side, the seventh lens further includes another concave surface facing the image side, and the eighth lens further includes another convex surface facing the image side.

In another exemplary embodiment, the wide-angle lens assembly satisfies the following condition: $|DT| \leq 5\%$; wherein DT is a F-theta distortion of the wide-angle lens assembly.

In yet another exemplary embodiment, the wide-angle lens assembly satisfies the following condition: $|P_{V\text{-}IR}| \leq 8$ μm; wherein $P_{V\text{-}IR}$ is an interval from a clearest image plane of a visible light to a clearest image plane of a infrared light along the optical axis.

In another exemplary embodiment, the wide-angle lens assembly satisfies the following condition: 3.3 mm<BFL<4 mm; wherein BFL is an interval from an image side surface of the ninth lens to an image plane along the optical axis.

In yet another exemplary embodiment, the wide-angle lens assembly satisfies the following condition: $-0.7\ \text{mm}^{-1} \leq 1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) + 1/(Nd_7 \times f_7) + 1/(Nd_8 \times f_8) + 1/(Nd_9 \times f_9) \leq 0.7\ \text{mm}^{-1}$; wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, $Nd_7$ is an index of refraction of the seventh lens, $Nd_8$ is an index of refraction of the eighth lens, $Nd_9$ is an index of refraction of the ninth lens, $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens, $f_7$ is an effective focal length of the seventh lens, $f_8$ is an effective focal length of the eighth lens, and $f_9$ is an effective focal length of the ninth lens.

In another exemplary embodiment, the wide-angle lens assembly satisfies the following condition: $1.5 < TTL/D_1 < 2$; wherein TTL is an interval from an object side surface of the first lens to an image plane along the optical axis and $D_1$ is an effective optical diameter of the first lens.

In yet another exemplary embodiment, the wide-angle lens assembly satisfies the following condition: $50 \leq Vd_6 - Vd_7 \leq 70$; wherein $Vd_6$ is an Abbe number of the sixth lens and $Vd_7$ is an Abbe number of the seventh lens.

In another exemplary embodiment, the wide-angle lens assembly satisfies the following condition: 135 degrees/mm<FOV/f<170 degrees/mm; wherein FOV is a full field of view of the wide-angle lens assembly and f is an effective focal length of the wide-angle lens assembly.

In yet another exemplary embodiment, the wide-angle lens assembly further includes a reflective element disposed between the second lens and the third lens.

The wide-angle lens assembly in accordance with another exemplary embodiment of the invention includes a first lens, a second lens, a third lens, a fourth lens, a fifth lens, a stop, a sixth lens, a seventh lens, an eighth lens, and a ninth lens, all of which are arranged in order from an object side to an image side along an optical axis. The first and second lenses are with negative refractive power and include a convex surface facing the object side and a concave surface facing the image side respectively. The third lens is a biconcave lens with negative refractive power. The fourth and fifth lenses are biconvex lenses with positive refractive power. The sixth lens is with positive refractive power and includes a convex surface facing the image side. The seventh lens is with negative refractive power and includes a concave surface facing the object side. The eighth lens is with positive refractive power and includes a convex surface facing the object side. The ninth lens is with positive refractive power and includes a concave surface facing the object side and a convex surface facing the image side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
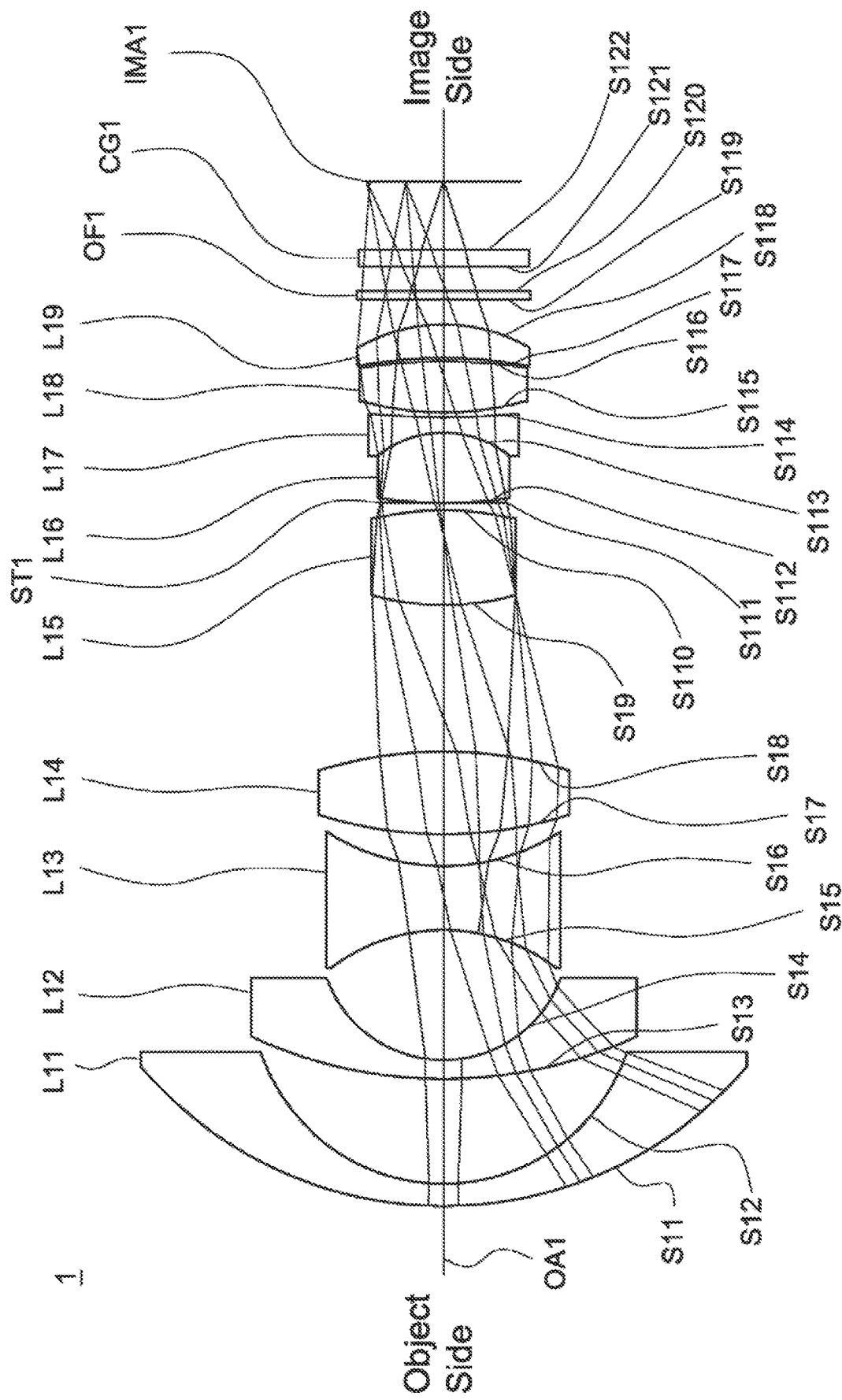
FIG. 1 is a lens layout and optical path diagram of a wide-angle lens assembly in accordance with a first embodiment of the invention.

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, a fourth lens, a fifth lens, a sixth lens, a seventh lens, an eighth lens, and a ninth lens. The first lens which is with negative refractive power and includes a convex surface facing an object side and a concave surface facing an image side. The second lens which is with negative refractive power and includes a convex surface facing the object side and a concave surface facing the image side. The third lens which is with negative refractive power and includes a concave surface facing the object side and another concave surface facing the image side. The fourth lens which is with positive refractive power and includes a convex surface facing the object side and another convex surface facing the image side. The fifth lens which is with positive refractive power and includes a convex surface facing the object side and another convex surface facing the image side. The sixth lens which is with positive refractive power and includes a convex surface facing the image side. The seventh lens which is with negative refractive power and includes a concave surface facing the object side. The eighth lens which is with positive refractive power and includes a convex surface facing the object side. The ninth lens which is with positive refractive power and includes a concave surface facing the object side and a convex surface facing the image side. The first lens, the second lens, the third lens, the fourth lens, the fifth lens, the sixth lens, the seventh lens, the eighth lens, and the ninth lens are arranged in order from the object side to the image side along an optical axis.

The present invention provides another wide-angle lens assembly including a first lens, a second lens, a third lens, a fourth lens, a fifth lens, a stop, a sixth lens, a seventh lens, an eighth lens, and a ninth lens. The first lens which is with negative refractive power and includes a convex surface facing an object side and a concave surface facing an image side. The second lens which is with negative refractive power and includes a convex surface facing the object side and a concave surface facing the image side. The third lens which is with negative refractive power and includes a concave surface facing the object side and another concave surface facing the image side. The fourth lens which is with positive refractive power and includes a convex surface facing the object side and another convex surface facing the image side. The fifth lens which is with positive refractive power and includes a convex surface facing the object side and another convex surface facing the image side. The sixth lens which is with positive refractive power and includes a convex surface facing the image side. The seventh lens which is with negative refractive power and includes a concave surface facing the object side. The eighth lens which is with positive refractive power and includes a convex surface facing the object side. The ninth lens which is with positive refractive power and includes a concave surface facing the object side and a convex surface facing the image side. The first lens, the second lens, the third lens, the fourth lens, the fifth lens, the stop, the sixth lens, the seventh lens, the eighth lens, and the ninth lens are arranged in order from the object side to the image side along an optical axis.

Referring to Table 1, Table 2, Table 4, Table 5, Table 7, and Table 8, wherein Table 1, Table 4, and Table 7 show optical specification in accordance with a first, second, and third embodiments of the invention respectively and Table 2, Table 5, and Table 8 show aspheric coefficient of each aspheric lens in Table 1, Table 4, and Table 7 respectively.

Figure 3:
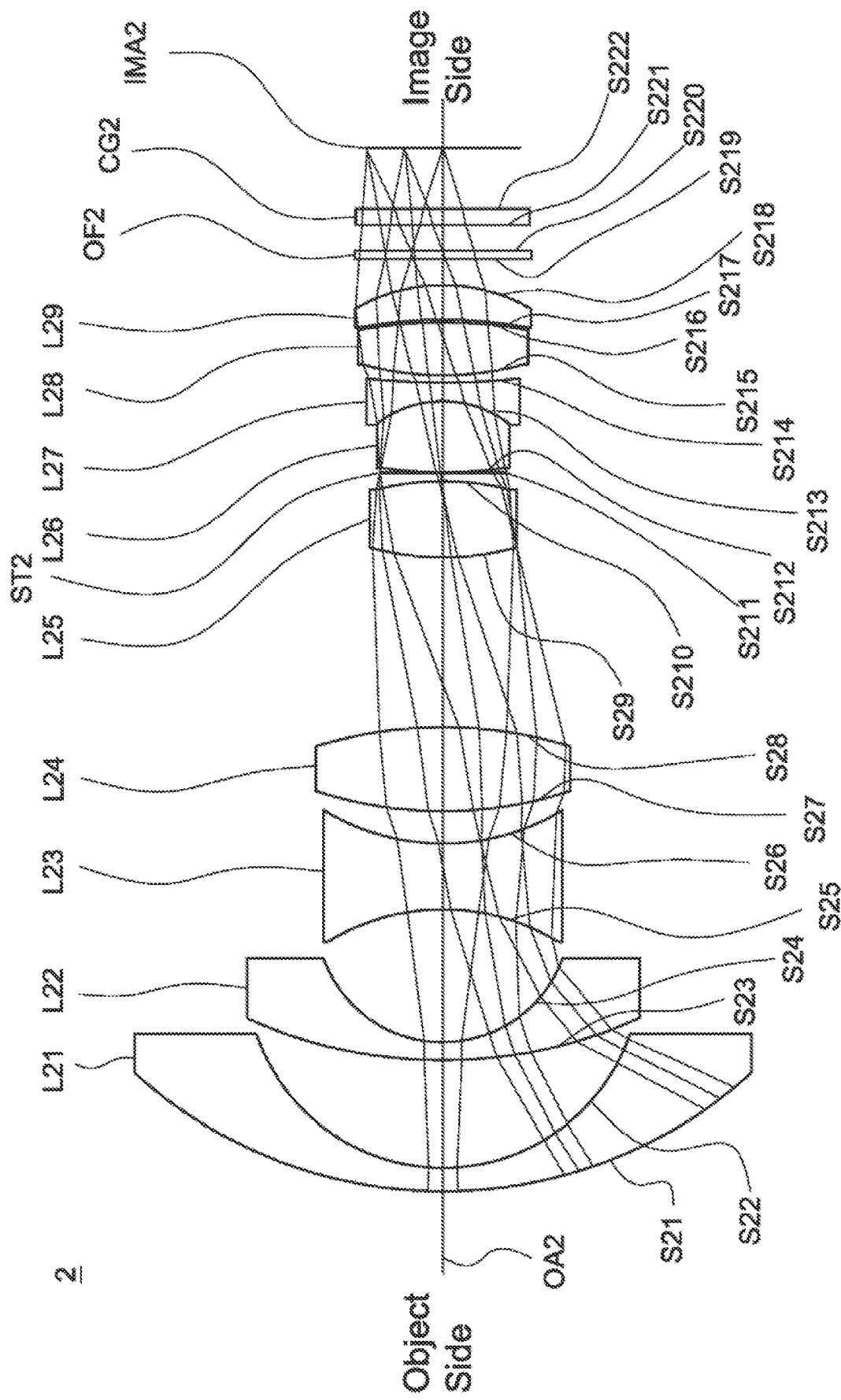
FIG. 3 is a lens layout and optical path diagram of a wide-angle lens assembly in accordance with a second embodiment of the invention.
Figure 5:
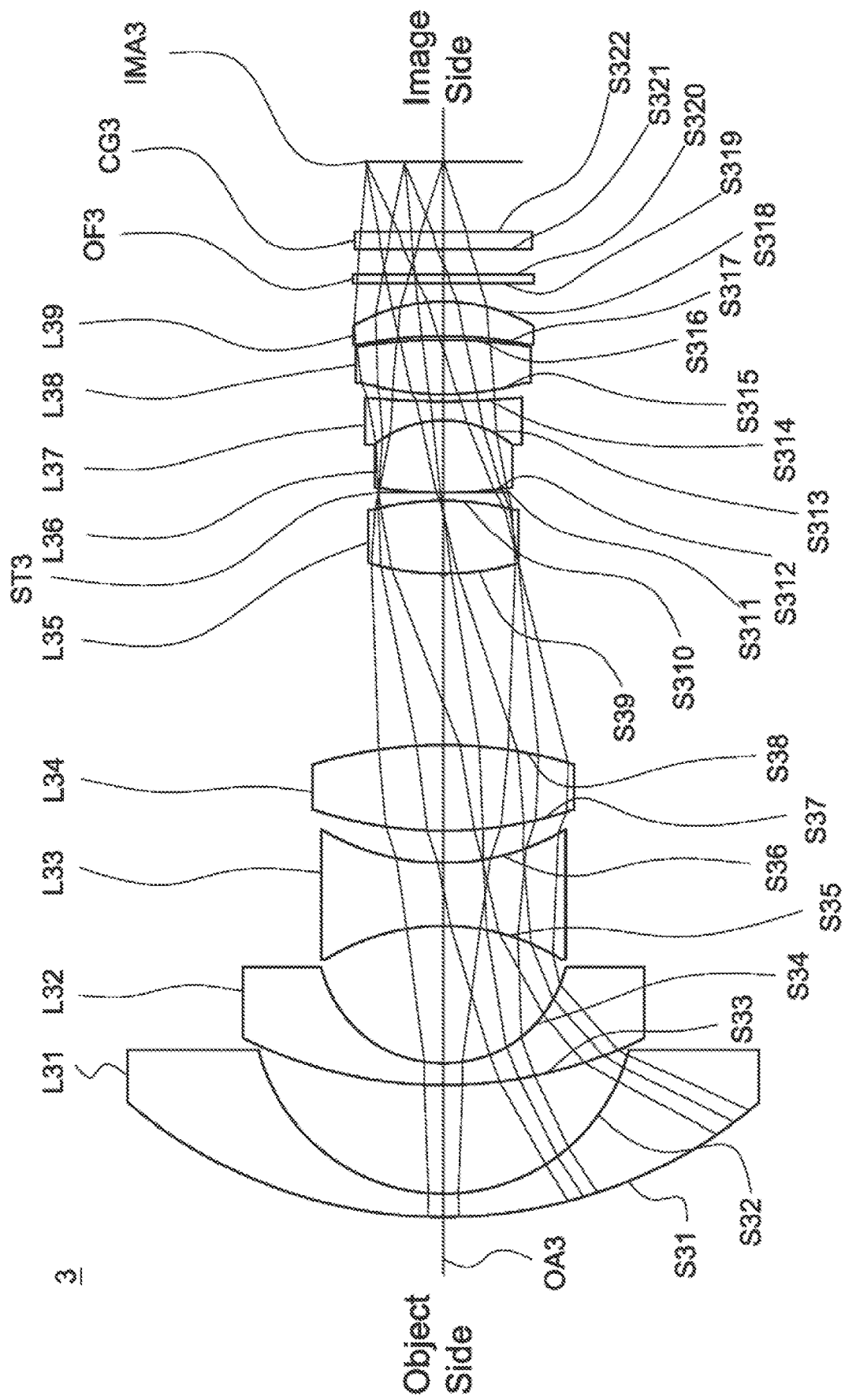
FIG. 5 is a lens layout and optical path diagram of a wide-angle lens assembly in accordance with a third embodiment of the invention.

FIG. 1, FIG. 3, and FIG. 5 are lens layout and optical path diagrams of the wide-angle lens assemblies in accordance with the first, second, and third embodiments of the invention respectively.

The first lenses L11, L21, L31 are meniscus lenses with negative refractive power and made of glass material, wherein the object side surfaces S11, S21, S31 are convex surfaces, the image side surfaces S12, S22, S32 are concave surfaces, and the object side surfaces S11, S21, S31 and the image side surfaces S12, S22, S32 are spherical surfaces.

The second lenses L12, L22, L32 are meniscus lenses with negative refractive power and made of glass material, wherein the object side surfaces S13, S23, S33 are convex surfaces, the image side surfaces S14, S24, S34 are concave surfaces, and the object side surfaces S13, S23, S33 and the image side surfaces S14, S24, S34 are spherical surfaces.

The third lenses L13, L23, L33 are biconcave lenses with negative refractive power and made of glass material, wherein the object side surfaces S15, S25, S35 are concave surfaces, the image side surfaces are S16, S26, S36 are concave surfaces, and the object side surfaces S15, S25, S35 and the image side surfaces S16, S26, S36 are spherical surfaces.

The fourth lenses L14, L24, L34 are biconvex lenses with positive refractive power and made of glass material, wherein the object side surfaces S17, S27, S37 are convex surfaces, the image side surfaces S18, S28, S38 are convex surfaces, and the object side surfaces S17, S27, S37 and the image side surfaces S18, S28, S38 are spherical surfaces.

The fifth lenses L15, L25, L35 are biconvex lenses with positive refractive power and made of glass material, wherein the object side surfaces S19, S29, S39 are convex surfaces, the image side surfaces S110, S210, S310 are convex surfaces, and the object side surfaces S19, S29, S39 and the image side surfaces S110, S210, S310 are spherical surfaces.

The sixth lenses L16, L26, L36 are biconvex lenses with positive refractive power and made of glass material, wherein the object side surfaces S112, S212, S312 are convex surfaces, the image side surfaces S113, S213, S313 are convex surfaces, and the object side surfaces S112, S212, S312 and the image side surfaces S113, S213, S313 are spherical surfaces.

The seventh lenses L17, L27, L37 are biconcave lenses with negative refractive power and made of glass material, wherein the object side surfaces S113, S213, S313 are concave surfaces, the image side surfaces S114, S214, S314 are concave surfaces, and the object side surfaces S113, S213, S313 and the image side surfaces S114, S214, S314 are spherical surfaces.

The eighth lenses L18, L28, L38 are biconvex lenses with positive refractive power and made of glass material, wherein the object side surfaces S115, S215, S315 are convex surfaces, the image side surfaces S116, S216, S316 are convex surfaces, and the object side surfaces S115, S215, S315 and the image side surfaces S116, S216, S316 are spherical surfaces.

The ninth lenses L19, L29, L39 are meniscus lenses with positive refractive power and made of plastic material, wherein the object side surfaces S117, S217, S317 are concave surfaces, the image side surfaces S118, S218, S318 are convex surfaces, and the object side surfaces S117, S217, S317 and the image side surfaces S118, S218, S318 are aspheric surfaces.

The sixth lenses L16, L26, L36 and the seventh lenses L17, L27, L37 are cemented respectively.

In addition, the wide-angle lens assemblies 1, 2, 3 satisfy at least one of the following conditions:

$$|DT| \leq 5\%; \quad (1)$$

$$|P_{V-IR}| \leq 8 \, \mu m; \quad (2)$$

$$3.3 \, mm < BFL < 4 \, mm; \quad (3)$$

$$-0.7 \, mm^{-1} \leq 1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) + 1/(Nd_7 \times f_7) + 1/(Nd_8 \times f_8) + 1/(Nd_9 \times f_9) \leq 0.7 \, mm^{-1}; \quad (4)$$

$$1.5 < TTL/D_1 < 2; \quad (5)$$

$$50 \leq Vd_6 - Vd_7 \leq 70; \quad (6)$$

$$135 \, degrees/mm < FOV/f < 170 \, degrees/mm; \quad (7)$$

wherein DT is a F-theta distortion of the wide-angle lens assemblies 1, 2, 3 for the first to third embodiments, $P_{V-IR}$ is an interval from a clearest image plane of a visible light to a clearest image plane of a infrared light along the optical axes OA1, OA2, OA3 for the first to third embodiments, BFL is an interval from image side surfaces S118, S218, S318 of the ninth lenses L19, L29, L39 to image planes IMA1, IMA2, IMA3 along the optical axes OA1, OA2, OA3 respectively for the first to third embodiments, $Nd_1$ is an index of refraction of the first lenses L11, L21, L31 for the first to third embodiments, $Nd_2$ is an index of refraction of the second lenses L12, L22, L32 for the first to third embodiments, $Nd_3$ is an index of refraction of the third lenses L13, L23, L33 for the first to third embodiments, $Nd_4$ is an index of refraction of the fourth lenses L14, L24, L34 for the first to third embodiments, $Nd_5$ is an index of refraction of the fifth lenses L15, L25, L35 for the first to third embodiments, $Nd_6$ is an index of refraction of the sixth lenses L16, L26, L36 for the first to third embodiments, $Nd_7$ is an index of refraction of the seventh lenses L17, L27, L37 for the first to third embodiments, $Nd_8$ is an index of refraction of the eighth lenses L18, L28, L38 for the first to third embodiments, $Nd_9$ is an index of refraction of the ninth lenses L19, L29, L39 for the first to third embodiments, $f_1$ is an effective focal length of the first lenses L11, L21, L31 for the first to third embodiments, $f_2$ is an effective focal length of the second lenses L12, L22, L32 for the first to third embodiments, $f_3$ is an effective focal length of the third lenses L13, L23, L33 for the first to third embodiments, $f_4$ is an effective focal length of the fourth lenses L14, L24, L34 for the first to third embodiments, $f_5$ is an effective focal length of the fifth lenses L15, L25, L35 for the first to third embodiments, $f_6$ is an effective focal length of the sixth lenses L16, L26, L36 for the first to third embodiments, $f_7$ is an effective focal length of the seventh lenses L17, L27, L37 for the first to third embodiments, $f_8$ is an effective focal length of the eighth lenses L18, L28, L38 for the first to third embodiments, $f_9$ is an effective focal length of the ninth lenses L19, L29, L39 for the first to third embodiments, TTL is an interval from an object side surfaces S1, S21, S31 of the first lenses L11, L21, L31 to image planes IMA1, IMA2, IMA3 along the optical axes OA1, OA2, OA3 respectively for the first to third embodiments, $D_1$ is an effective optical diameter of the first lenses L11, L21, L31 for the first to third embodiments, $Vd_6$ is an Abbe number of the sixth lenses L16, L26, L36 for the first to third embodiments, $Vd_7$ is an Abbe number of the seventh lenses L17, L27, L37 for the first to third embodiments, FOV is a full field of view of the wide-angle lens assemblies 1, 2, 3 for the first to third embodiments, and f is an effective focal length of the wide-angle lens assemblies 1, 2, 3 for the first to third embodiments. With the lens assemblies 1, 2, 3 satisfying at least one of the above conditions (1)-(7), the field of view can be effectively increased, the peripheral image can be effectively increased, the back focal length can be effectively increased, the quality of infrared light image can be effectively increased, the environmental temperature change can be effectively resisted, the aberration can be effectively corrected, and the chromatic aberration can be effectively corrected.

When the condition (1): $|DT| \leq 5\%$ is satisfied, the peripheral image can be effectively increased.

When the condition (2): $|P_{V-IR}| \leq 8 \, \mu m$ is satisfied, the image of visible light and infrared light can be maintained with good optical performance simultaneously.

When the condition (3): 3.3 mm<BFL<4 mm is satisfied, the back focal length is longer, which is benefit to the assembly and manufacturing of the wide-angle lens assembly.

When the condition (4): $-0.7 \, mm^{-1} \leq 1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) + 1/(Nd_7 \times f_7) + 1/(Nd_8 \times f_8) + 1/(Nd_9 \times f_9) \leq 0.7 \, mm^{-1}$ is satisfied, the field of view can be corrected with the best effect.

When the condition (5): $1.5 < TTL/D_1 < 2$ is satisfied, the total lens length is shorter.

When the condition (6): $50 \leq Vd_6-Vd_7 \leq 70$ is satisfied, the chromatic aberration can be better corrected.

When the condition (7): 135 degrees/mm<FOV/f<170 degrees/mm is satisfied, the F-theta distortion can be controlled effectively.

When the first to eighth lenses are glass spherical lenses and the ninth lens is a plastic aspherical lens, the number of lenses can be effectively reduced and the environmental temperature change can be effectively resisted.

A detailed description of a wide-angle lens assembly in accordance with a first embodiment of the invention is as follows. Referring to FIG. 1, the wide-angle lens assembly 1 includes a first lens L11, a second lens L12, a third lens L13, a fourth lens L14, a fifth lens L15, a stop ST1, a sixth lens L16, a seventh lens L17, an eighth lens L18, a ninth lens L19, an optical filter OF1, and a cover glass CG1, all of which are arranged in order from an object side to an image side along an optical axis OA1. In operation, an image of light rays from the object side is formed at an image plane IMA1.

According to the foregoing, wherein: both of the object side surface S119 and image side surface S120 of the optical filter OF1 are plane surfaces; and both of the object side surface S121 and image side surface S122 of the cover glass CG1 are plane surfaces.

With the above design of the lenses and stop ST1 and at least any one of the conditions (1)-(7) satisfied, the wide-angle lens assembly 1 can have an effective increased field of view, an effective increased peripheral image, an effective increased back focal length, an effective increased image quality of infrared light, an effective resisted environmental temperature change, an effective corrected aberration, and an effective corrected chromatic aberration.

Table 1 shows the optical specification of the wide-angle lens assembly 1 in FIG. 1.

TABLE 1

| Effective Focal Length = 1.217 mm | | | | | F-number = 1.64 | |
| Total Lens Length = 25.60 mm | | | | | Field of View = 190 degrees | |

| Surface Number | Radius of Curvature (mm) | Thickness (mm) | Nd | Vd | Effective Focal Length (mm) | Remark |
| --- | --- | --- | --- | --- | --- | --- |
| S11 | 10.01 | 0.56 | 1.89 | 41 | −11.1254 | The First Lens L11 |
| S12 | 4.86 | 2.62 | | | | |
| S13 | 11.69 | 0.46 | 1.89 | 41 | −4.8799 | The Second Lens L12 |
| S14 | 3.12 | 3.26 | | | | |
| S15 | −4.71 | 1.61 | 1.5 | 83 | −4.81402 | The Third Lens L13 |
| S16 | 5.51 | 0.78 | | | | |
| S17 | 10.08 | 2.07 | 1.96 | 32 | 5.638931 | The Fourth Lens L14 |
| S18 | −10.65 | 3.65 | | | | |
| S19 | 6.62 | 2.38 | 1.5 | 83 | 7.197634 | The Fifth Lens L15 |
| S110 | −6.97 | 0.18 | | | | |
| S111 | ∞ | 0.01 | | | | Stop ST1 |
| S112 | 11.34 | 1.72 | 1.5 | 83 | 4.487844 | The Sixth Lens L16 |
| S113 | −2.66 | 0.40 | 1.846 | 23.77 | −2.7349 | The Seventh Lens L17 |
| S114 | 20.13 | 0.12 | | | | |
| S115 | 7.35 | 1.29 | 1.6 | 68 | 8.0063 | The Eighth Lens L18 |
| S116 | −13.04 | 0.09 | | | | |
| S117 | −11.95 | 0.83 | 1.64 | 25 | 8.9909 | The Ninth Lens L19 |
| S118 | −4.01 | 0.63 | | | | |
| S119 | ∞ | 0.21 | 1.52 | 64 | | Optical Filter OF1 |
| S120 | ∞ | 1.88 | | | | |
| S121 | ∞ | 0.40 | 1.52 | 64 | | Cover Glass CG1 |
| S122 | ∞ | 0.45 | | | | |

The aspheric surface sag z of each aspheric lens in table 1 can be calculated by the following formula:

$$z=ch^2/\{1+[1-(k+1)c^2h^2]^{1/2}\}+Ah^4+Bh^6+Ch^8+Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each aspheric lens are shown in Table 2.

TABLE 2

| Surface Number | k | A | B | C | D |
| --- | --- | --- | --- | --- | --- |
| S117 | 0 | −3.825E−03 | −1.053E−03 | 5.725E−04 | −4.367E−05 |
| S118 | −0.127 | −3.311E−05 | −1.245E−03 | 4.998E−04 | −3.294E−05 |

Table 3 shows the parameters and condition values for conditions (1)-(7) in accordance with the first embodiment of the invention. It can be seen from Table 3 that the wide-angle lens assembly 1 of the first embodiment satisfies the conditions (1)-(7).

TABLE 3

| | DT | | 4.53% | | $P_{V\text{-}IR}$ | | 4 μm | BFL | 3.57 mm |
|---|---|---|---|---|
| $D_1$ | 15.17 mm | $TTL/D_1$ | 1.688 | $Vd_6\text{-}Vd_7$ | 59.230 |
| $1/(Nd_1 \times f_1) + 1/(Nd_2 \times f_2) + 1/(Nd_3 \times f_3) +$ $1/(Nd_4 \times f_4) + 1/(Nd_5 \times f_5) + 1/(Nd_6 \times f_6) +$ $1/(Nd_7 \times f_7) + 1/(Nd_8 \times f_8) + 1/(Nd_9 \times f_9)$ | −0.0145 mm$^{-1}$ | FOV/f | 156.122 degrees/mm |

Figure 2A:
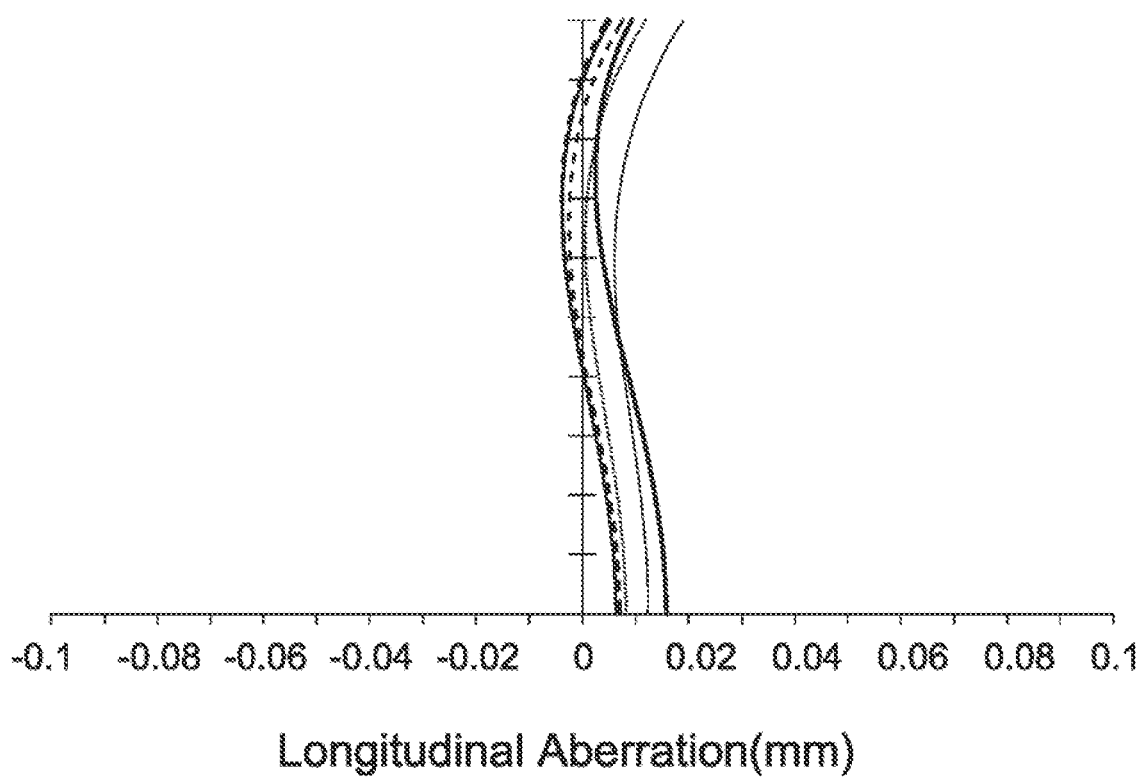
FIG. 2A depicts a longitudinal aberration diagram of the wide-angle lens assembly in accordance with the first embodiment of the invention.
Figure 2B:
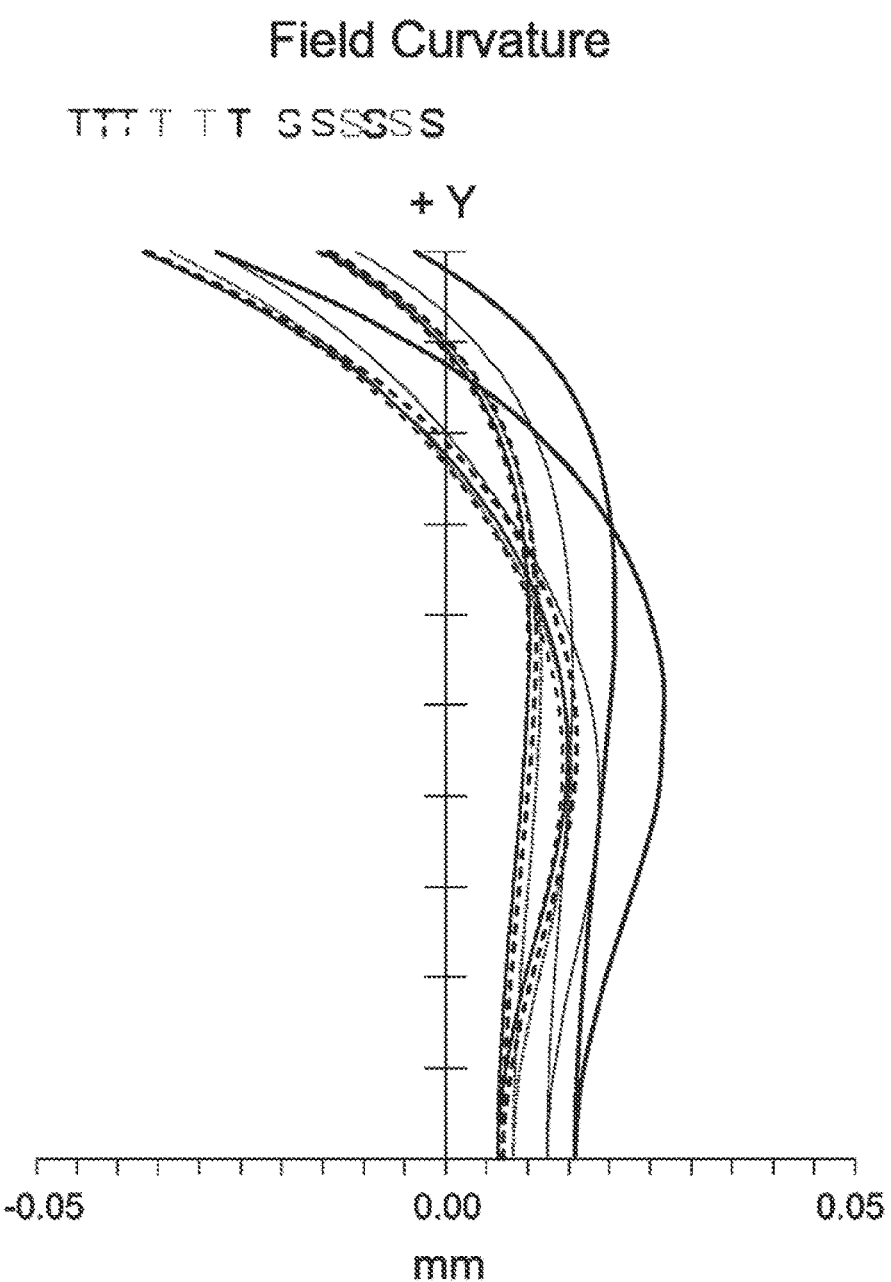
FIG. 2B is a field curvature diagram of the wide-angle lens assembly in accordance with the first embodiment of the invention.
Figure 2C:
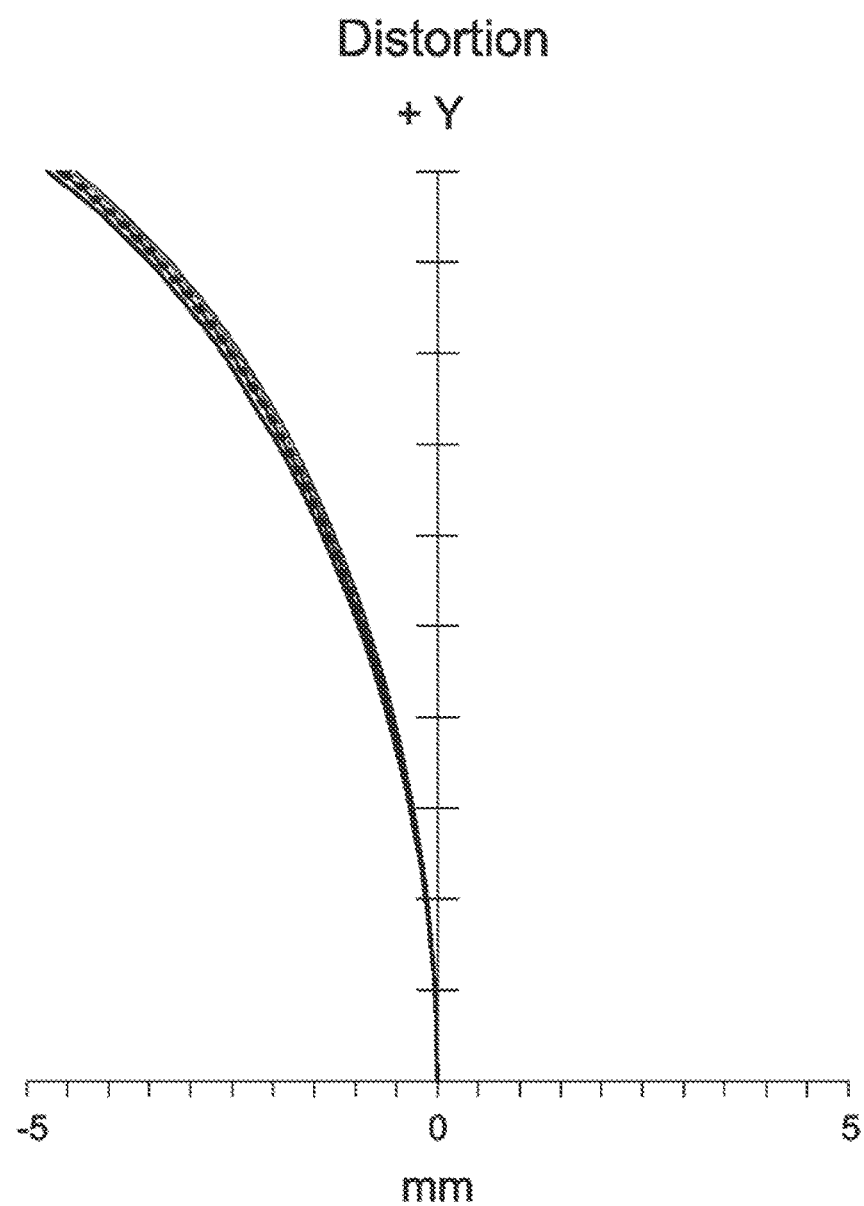
FIG. 2C is a F-theta distortion diagram of the wide-angle lens assembly in accordance with the first embodiment of the invention.

By the above arrangements of the lenses and stop ST1, the wide-angle lens assembly 1 of the first embodiment can meet the requirements of optical performance as seen in FIGS. 2A-2C.

It can be seen from FIG. 2A that the longitudinal aberration in the wide-angle lens assembly 1 of the first embodiment ranges from −0.005 mm to 0.02 mm. It can be seen from FIG. 2B that the field curvature of tangential direction and sagittal direction in the wide-angle lens assembly 1 of the first embodiment ranges from −0.04 mm to 0.03 mm. It can be seen from FIG. 2C that the F-theta distortion in the wide-angle lens assembly 1 of the first embodiment ranges from −5% to 0%.

It is obvious that the longitudinal aberration, the field curvature, and the F-theta distortion of the wide-angle lens assembly 1 of the first embodiment can be corrected effectively. Therefore, the wide-angle lens assembly 1 of the first embodiment is capable of good optical performance.

Referring to FIG. 3, the wide-angle lens assembly 2 includes a first lens L21, a second lens L22, a third lens L23, a fourth lens L24, a fifth lens L25, a stop ST2, a sixth lens L26, a seventh lens L27, an eighth lens L28, a ninth lens L29, an optical filter OF2, and a cover glass CG2, all of which are arranged in order from an object side to an image side along an optical axis OA2. In operation, an image of light rays from the object side is formed at an image plane IMA2.

According to the foregoing, wherein: both of the object side surface S219 and image side surface S220 of the optical filter OF2 are plane surfaces; and both of the object side surface S221 and image side surface S222 of the cover glass CG2 are plane surfaces.

With the above design of the lenses and stop ST2 and at least any one of the conditions (1)-(7) satisfied, the wide-angle lens assembly 2 can have an effective increased field of view, an effective increased peripheral image, an effective increased back focal length, an effective increased image quality of infrared light, an effective resisted environmental temperature change, an effective corrected aberration, and an effective corrected chromatic aberration.

Table 4 shows the optical specification of the wide-angle lens assembly 2 in FIG. 3.

TABLE 4

| Effective Focal Length = 1.189 mm | | | | | F-number = 1.65 | |
| Total Lens Length = 25.50 mm | | | | | Field of View = 190 degrees | |

| Surface Number | Radius of Curvature (mm) | Thickness (mm) | Nd | Vd | Effective Focal Length (mm) | Remark |
|---|---|---|---|---|---|---|
| S21 | 11.40 | 0.56 | 1.89 | 41 | −9.867099 | The First Lens L21 |
| S22 | 4.86 | 2.62 | | | | |
| S23 | 11.67 | 0.46 | 1.86 | 37 | −5.0552 | The Second Lens L22 |
| S24 | 3.12 | 3.26 | | | | |
| S25 | −5.40 | 1.61 | 1.49 | 80 | −5.38907 | The Third Lens L23 |
| S26 | 5.70 | 0.78 | | | | |
| S27 | 10.06 | 2.06 | 1.95 | 32 | 5.6874316 | The Fourth Lens L24 |
| S28 | −10.63 | 4.14 | | | | |
| S29 | 6.83 | 1.88 | 1.51 | 83 | 7.0133992 | The Fifth Lens L25 |
| S210 | −6.84 | 0.21 | | | | |
| S211 | ∞ | 0.01 | | | | Stop ST2 |
| S212 | 11.36 | 1.73 | 1.5 | 82.6 | 4.4849475 | The Sixth Lens L26 |
| S213 | −2.66 | 0.45 | 1.846 | 23.77 | −2.723186 | The Seventh Lens L27 |
| S214 | 19.78 | 0.17 | | | | |
| S215 | 7.36 | 1.29 | 1.61 | 65 | 7.91756 | The Eighth Lens L28 |
| S216 | −13.20 | 0.09 | | | | |
| S217 | −11.93 | 0.83 | 1.65 | 25 | 8.87959 | The Ninth Lens L29 |
| S218 | −4.02 | 0.63 | | | | |
| S219 | ∞ | 0.21 | 1.52 | 64 | | Optical Filter OF2 |
| S220 | ∞ | 1.65 | | | | |
| S221 | ∞ | 0.40 | 1.52 | 64 | | Cover Glass CG2 |
| S222 | ∞ | 0.45 | | | | |

The definition of aspheric surface sag z of each aspheric lens in table 4 is the same as that of in Table 1, and is not described here again.

In the second embodiment, the conic constant k and the aspheric coefficients A, B, C, D of each aspheric lens are shown in Table 5.

TABLE 5

| Surface Number | k | A | B | C | D |
|---|---|---|---|---|---|
| S217 | 0 | −3.929E−03 | −1.064E−03 | 5.7306E−04 | −4.426E−05 |
| S218 | −0.151 | 1.919E−05 | −1.235E−03 | 5.0290E−04 | −3.249E−05 |

Table 6 shows the parameters and condition values for conditions (1)-(7) in accordance with the second embodiment of the invention. It can be seen from Table 6 that the wide-angle lens assembly 2 of the second embodiment satisfies the conditions (1)-(7).

TABLE 6

| $|DT|$ | 4.86% | $|P_{V-IR}|$ | 3.7 μm | BFL | 3.34 mm |
|---|---|---|---|---|---|
| $D_1$ | 15.17 mm | $TTL/D_1$ | 1.681 | $Vd_6-Vd_7$ | 58.830 |
| $1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) + 1/(Nd_7 \times f_7) + 1/(Nd_8 \times f_8) + 1/(Nd_9 \times f_9)$ | | | −0.003 mm$^{-1}$ | FOV/f | 159.798 degrees/mm |

Figure 4A:
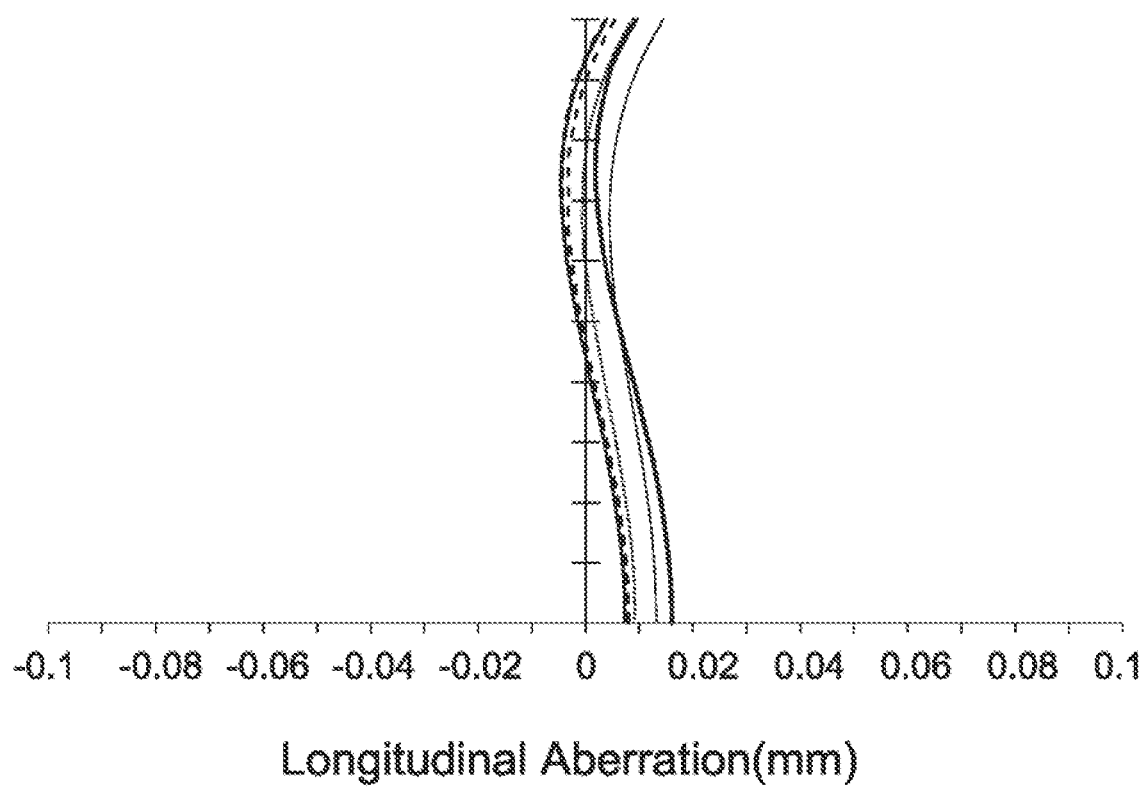
FIG. 4A depicts a longitudinal aberration diagram of the wide-angle lens assembly in accordance with the second embodiment of the invention.
Figure 4B:
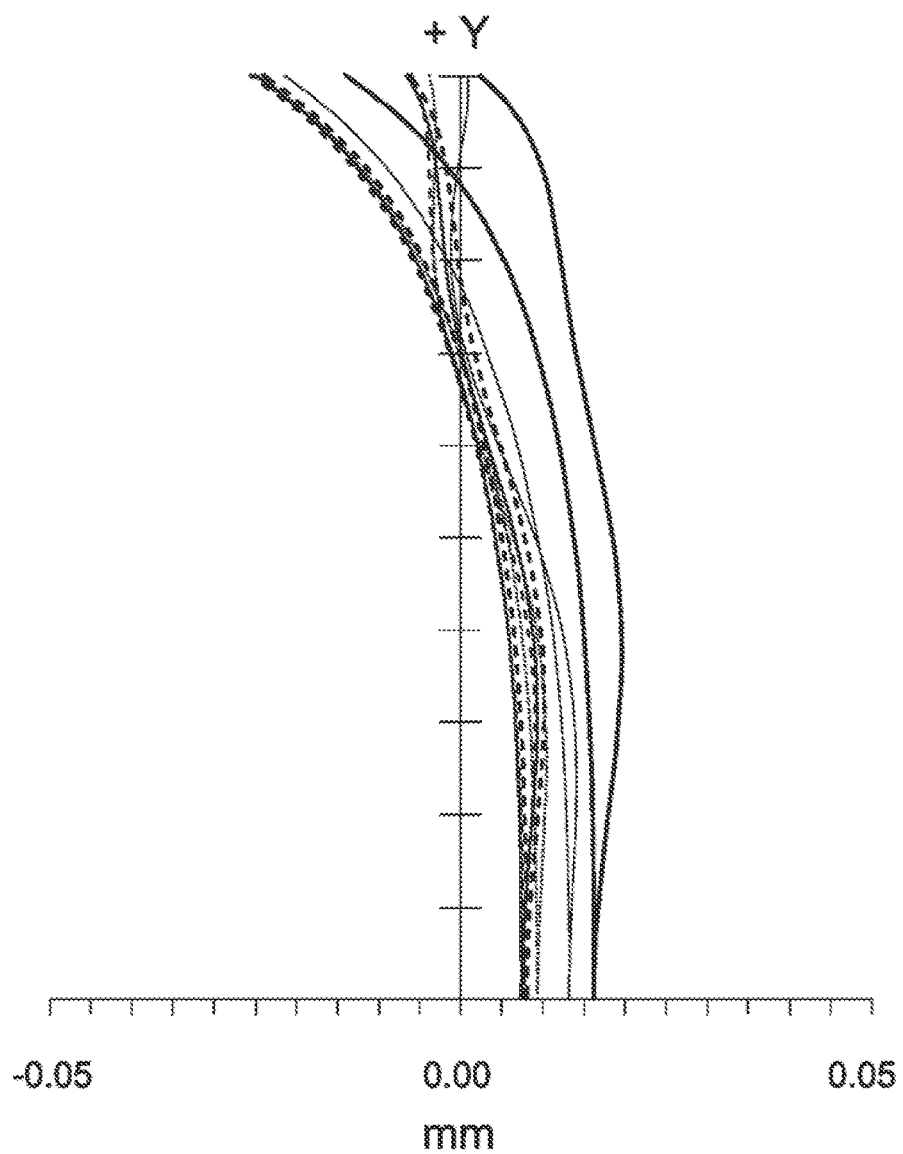
FIG. 4B is a field curvature diagram of the wide-angle lens assembly in accordance with the second embodiment of the invention.
Figure 4C:
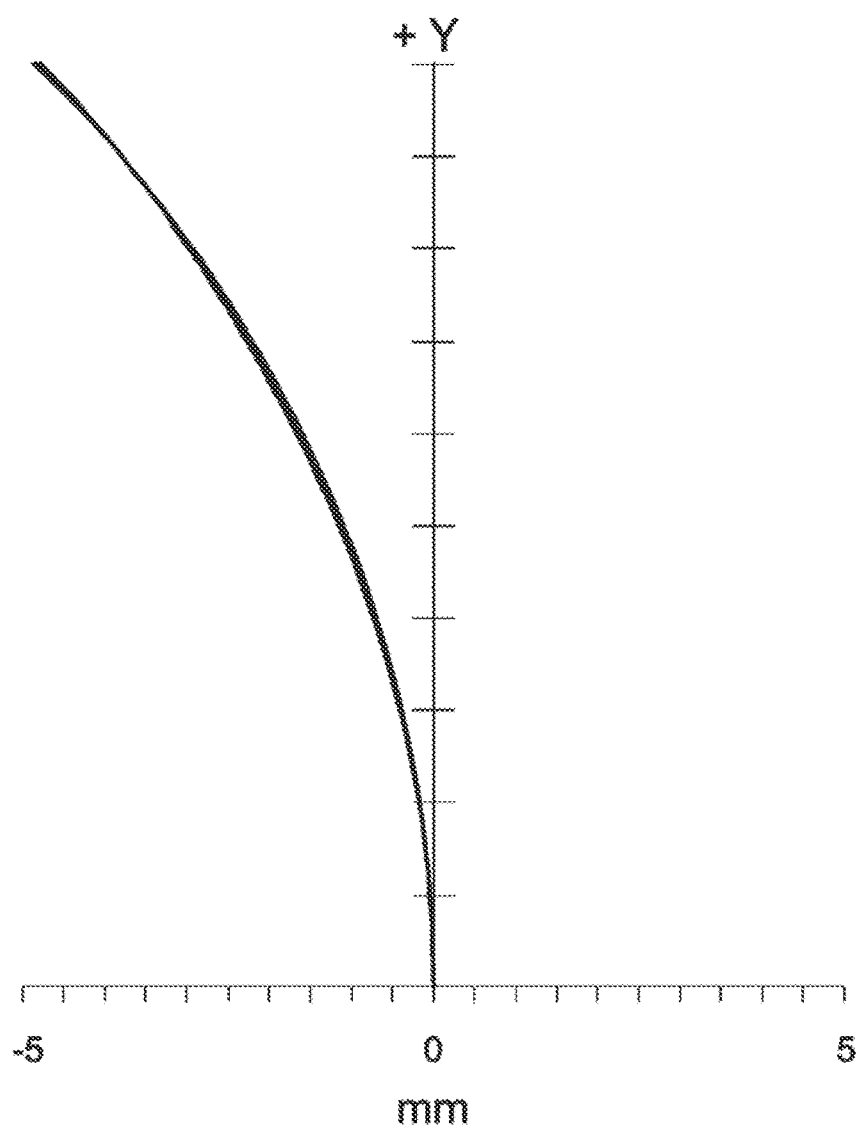
FIG. 4C is a F-theta distortion diagram of the wide-angle lens assembly in accordance with the first embodiment of the invention.

By the above arrangements of the lenses and stop ST2, the wide-angle lens assembly 2 of the second embodiment can meet the requirements of optical performance as seen in FIGS. 4A-4C.

It can be seen from FIG. 4A that the longitudinal aberration in the wide-angle lens assembly 2 of the second embodiment ranges from −0.005 mm to 0.02 mm. It can be seen from FIG. 4B that the field curvature of tangential direction and sagittal direction in the wide-angle lens assembly 2 of the second embodiment ranges from −0.03 mm to 0.02 mm. It can be seen from FIG. 4C that the F-theta distortion in the wide-angle lens assembly 2 of the second embodiment ranges from −5% to 0%.

It is obvious that the longitudinal aberration, the field curvature, and the F-theta distortion of the wide-angle lens assembly 2 of the second embodiment can be corrected effectively. Therefore, the wide-angle lens assembly 2 of the second embodiment is capable of good optical performance.

Referring to FIG. 5, the wide-angle lens assembly 3 includes a first lens L31, a second lens L32, a third lens L33, a fourth lens L34, a fifth lens L35, a stop ST3, a sixth lens L36, a seventh lens L37, an eighth lens L38, a ninth lens L39, an optical filter OF3, and a cover glass CG3, all of which are arranged in order from an object side to an image side along an optical axis OA3. In operation, an image of light rays from the object side is formed at an image plane IMA3.

According to the foregoing, wherein: both of the object side surface S319 and image side surface S320 of the optical filter OF3 are plane surfaces; and both of the object side surface S321 and image side surface S322 of the cover glass CG3 are plane surfaces.

With the above design of the lenses and stop ST3 and at least any one of the conditions (1)-(7) satisfied, the wide-angle lens assembly 3 can have an effective increased field of view, an effective increased peripheral image, an effective increased back focal length, an effective increased image quality of infrared light, an effective resisted environmental temperature change, an effective corrected aberration, and an effective corrected chromatic aberration.

Table 7 shows the optical specification of the wide-angle lens assembly 3 in FIG. 5.

TABLE 7

| Effective Focal Length = 1.187 mm | | | | F-number = 1.65 | |
|---|---|---|---|---|---|
| Total Lens Length = 25.41 mm | | | | Field of View = 190 degrees | |
| Surface Number | Radius of Curvature (mm) | Thickness (mm) | Nd | Vd | Effective Focal Length (mm) | Remark |
| S31 | 11.86 | 0.56 | 1.82 | 41 | −9.458108 | The First Lens L31 |
| S32 | 4.60 | 2.62 | | | | |
| S33 | 10.90 | 0.54 | 1.82 | 37 | −5.2325 | The Second Lens L32 |
| S34 | 3.02 | 3.30 | | | | |
| S35 | −5.38 | 1.51 | 1.49 | 83 | −5.42976 | The Third Lens L33 |
| S36 | 5.78 | 0.78 | | | | |
| S37 | 10.05 | 2.07 | 1.95 | 32 | 5.6934005 | The Fourth Lens L34 |
| S38 | −10.67 | 4.12 | | | | |
| S39 | 6.81 | 1.76 | 1.51 | 83 | 6.993666 | The Fifth Lens L35 |
| S310 | −6.87 | 0.19 | | | | |
| S311 | ∞ | 0.01 | | | | Stop ST3 |

TABLE 7-continued

| | | | | | | |
|---|---|---|---|---|---|---|
| S312 | 10.99 | 1.73 | 1.5 | 82.5 | 4.4635424 | The Sixth Lens L36 |
| S313 | −2.66 | 0.46 | 1.846 | 23.77 | −2.708807 | The Seventh Lens L37 |
| S314 | 19.00 | 0.17 | | | | |
| S315 | 7.20 | 1.31 | 1.61 | 65.7 | 7.80165 | The Eighth Lens L38 |
| S316 | −13.21 | 0.09 | | | | |
| S317 | −11.49 | 0.84 | 1.65 | 25 | 9.01661 | The Ninth Lens L39 |
| S318 | −4.01 | 0.44 | | | | |
| S319 | ∞ | 0.21 | 1.52 | 64 | | Optical Filter OF3 |
| S320 | ∞ | 1.86 | | | | |
| S321 | ∞ | 0.40 | 1.52 | 64 | | Cover Glass CG3 |
| S322 | ∞ | 0.45 | | | | |

The definition of aspheric surface sag z of each aspheric lens in table 7 is the same as that of in Table 1, and is not described here again.

In the third embodiment, the conic constant k and the aspheric coefficients A, B, C, D of each aspheric lens are shown in Table 8.

TABLE 8

| Surface Number | k | A | B | C | D |
|---|---|---|---|---|---|
| S317 | 0 | −3.888E−03 | −1.055E−03 | 5.734E−04 | −4.461E−05 |
| S318 | −0.135 | −2.764E−05 | −1.244E−03 | 5.021E−04 | −3.238E−05 |

Table 9 shows the parameters and condition values for conditions (1)-(7) in accordance with the third embodiment of the invention. It can be seen from Table 9 that the wide-angle lens assembly 3 of the third embodiment satisfies the conditions (1)-(7).

TABLE 9

| |DT| | 4.97% | $|P_{V\text{-}IR}|$ | 0.8 μm | BFL | 3.35 mm |
|---|---|---|---|---|---|
| $D_1$ | 15.17 mm | $TTL/D_1$ | 1.675 | $Vd_6\text{-}Vd_7$ | 58.730 |
| $1/(Nd_1 \times f_1) + 1/(Nd_2 \times f_2) + 1/(Nd_3 \times f_3) +$ $1/(Nd_4 \times f_4) + 1/(Nd_5 \times f_5) + 1/(Nd_6 \times f_6) +$ $1/(Nd_7 \times f_7) + 1/(Nd_8 \times f_8) + 1/(Nd_9 \times f_9)$ | | | −0.0052 mm$^{-1}$ | FOV/f | 160.067 degrees/mm |

Figure 6A:
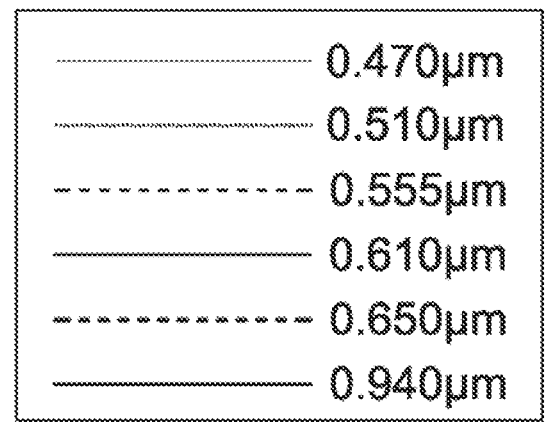
FIG. 6A depicts a longitudinal aberration diagram of the wide-angle lens assembly in accordance with the third embodiment of the invention.
Figure 6A:
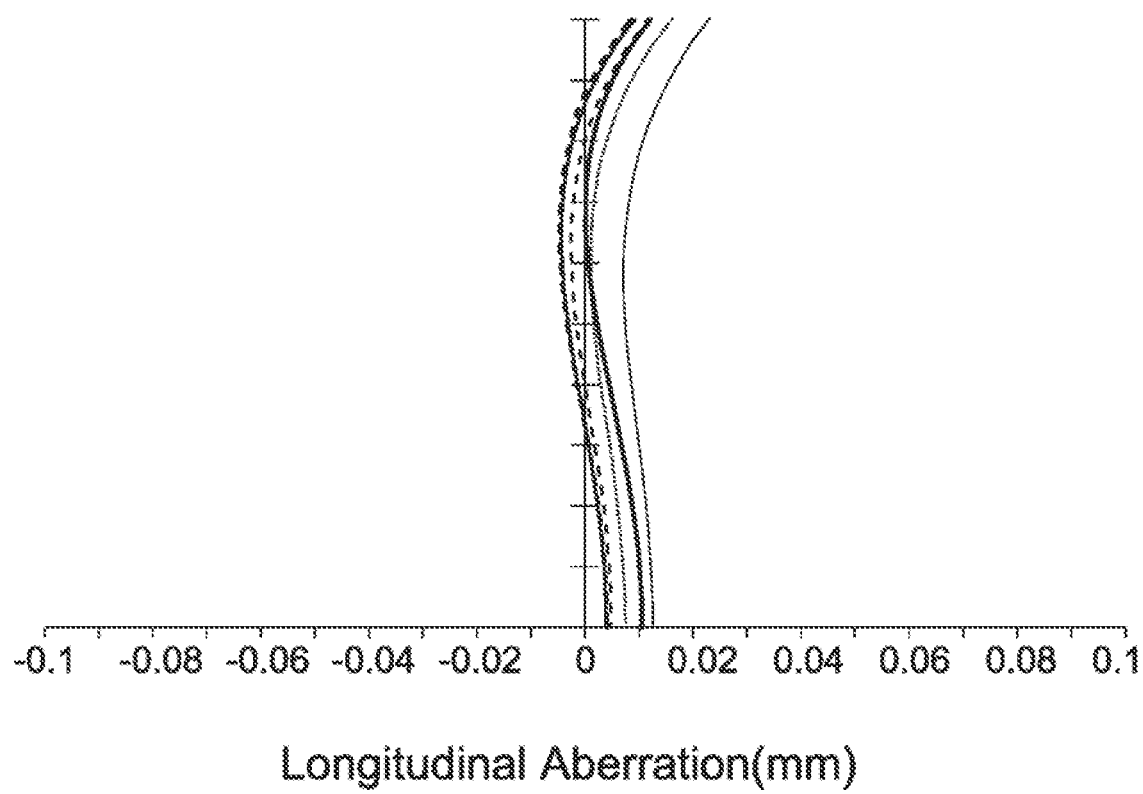
Figure 6B:
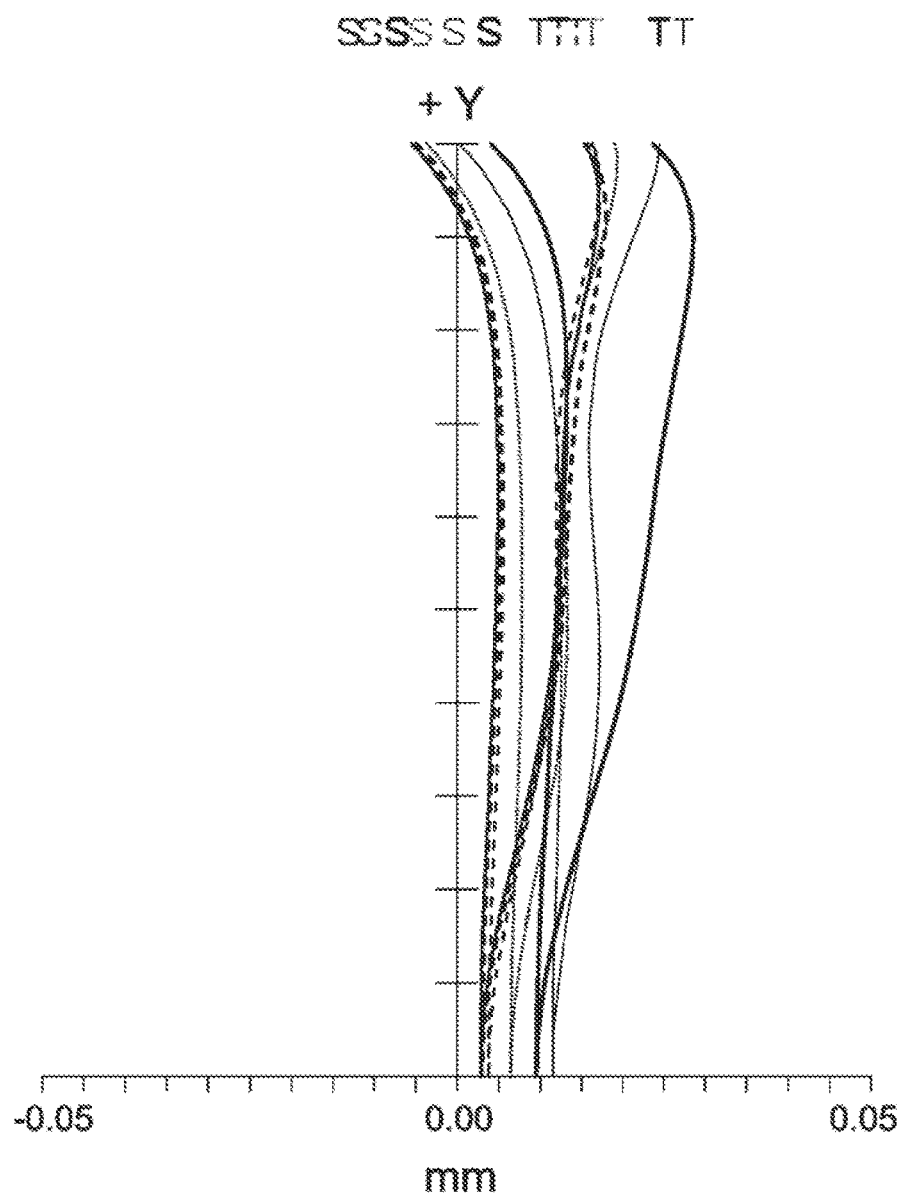
FIG. 6B is a field curvature diagram of the wide-angle lens assembly in accordance with the third embodiment of the invention.
Figure 6C:
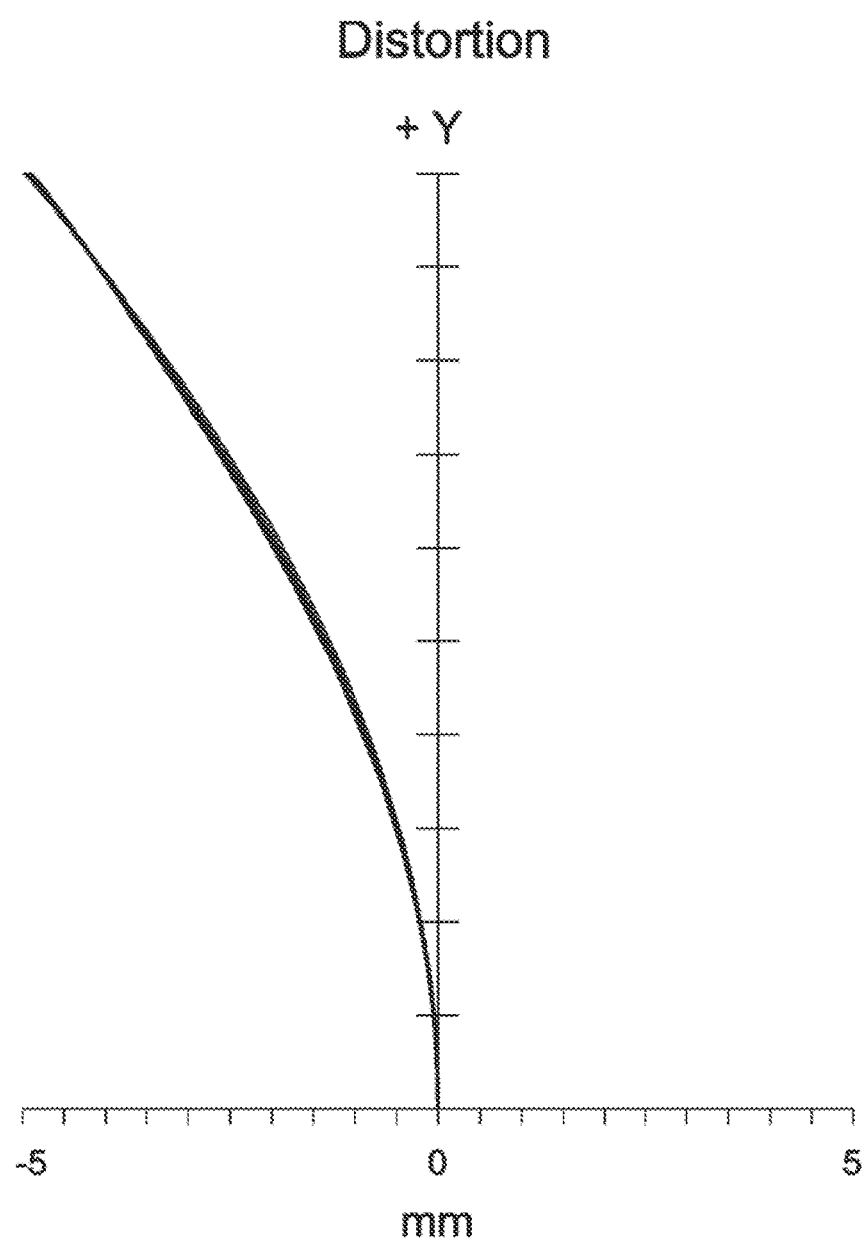
FIG. 6C is a F-theta distortion diagram of the wide-angle lens assembly in accordance with the third embodiment of the invention.

By the above arrangements of the lenses and stop ST3, the wide-angle lens assembly 3 of the third embodiment can meet the requirements of optical performance as seen in FIGS. 6A-6C.

It can be seen from FIG. 6A that the longitudinal aberration in the wide-angle lens assembly 3 of the third embodiment ranges from −0.005 mm to 0.025 mm. It can be seen from FIG. 6B that the field curvature of tangential direction and sagittal direction in the wide-angle lens assembly 3 of the third embodiment ranges from −0.01 mm to 0.03 mm. It can be seen from FIG. 6C that the F-theta distortion in the wide-angle lens assembly 3 of the third embodiment ranges from −5% to 0%.

It is obvious that the longitudinal aberration, the field curvature, and the F-theta distortion of the wide-angle lens assembly 3 of the third embodiment can be corrected effectively. Therefore, the wide-angle lens assembly 3 of the third embodiment is capable of good optical performance.

In the above embodiments, since there is no flat surface in the wide-angle lens assembly, there are fewer ghost images.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
   a first lens which is with negative refractive power and comprises a convex surface facing an object side and a concave surface facing an image side;
   a second lens which is with negative refractive power and comprises a convex surface facing the object side and a concave surface facing the image side;
   a third lens which is with negative refractive power and comprises a concave surface facing the object side and another concave surface facing the image side;
   a fourth lens which is with positive refractive power and comprises a convex surface facing the object side and another convex surface facing the image side;
   a fifth lens which is with positive refractive power and comprises a convex surface facing the object side and another convex surface facing the image side;
   a sixth lens which is with positive refractive power and comprises a convex surface facing the image side;
   a seventh lens which is with negative refractive power and comprises a concave surface facing the object side;
   an eighth lens which is with positive refractive power and comprises a convex surface facing the object side; and
   a ninth lens which is with positive refractive power and comprises a concave surface facing the object side and a convex surface facing the image side;
   wherein the wide-angle lens assembly satisfies the following condition:

3.3 mm<*BFL*<4 mm;

wherein BFL is an interval from an image side surface of the ninth lens to an image plane along the optical axis;

wherein the first lens, the second lens, the third lens, the fourth lens, the fifth lens, the sixth lens, the seventh lens, the eighth lens, and the ninth lens are arranged in order from the object side to the image side along an optical axis.

2. The wide-angle lens assembly as claimed in claim 1, further comprising a stop disposed between the fifth lens and the sixth lens, wherein the sixth lens is cemented with the seventh lens.

3. The wide-angle lens assembly as claimed in claim 1, wherein:
the sixth lens further comprises another convex surface facing the object side;
the seventh lens further comprises another concave surface facing the image side; and
the eighth lens further comprises another convex surface facing the image side.

4. The wide-angle lens assembly as claimed in claim 1, wherein the wide-angle lens assembly satisfies the following condition:

$$|DT| \leq 5\%;$$

wherein DT is a F-theta distortion of the wide-angle lens assembly.

5. The wide-angle lens assembly as claimed in claim 1, wherein the wide-angle lens assembly satisfies the following condition:

$$|P_{V\text{-}IR}| \leq 8\ \mu m;$$

wherein $P_{V\text{-}IR}$ is an interval from a clearest image plane of a visible light to a clearest image plane of a infrared light along the optical axis.

6. The wide-angle lens assembly as claimed in claim 1, wherein the wide-angle lens assembly satisfies the following condition:

$$-0.7\ mm^{-1} \leq 1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) + 1/(Nd_7 \times f_7) + 1/(Nd_8 \times f_8) + 1/(Nd_9 \times f_9) \leq 0.7\ mm^{-1};$$

wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, $Nd_7$ is an index of refraction of the seventh lens, $Nd_8$ is an index of refraction of the eighth lens, $Nd_9$ is an index of refraction of the ninth lens, $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens, $f_7$ is an effective focal length of the seventh lens, $f_8$ is an effective focal length of the eighth lens, and $f_9$ is an effective focal length of the ninth lens.

7. The wide-angle lens assembly as claimed in claim 1, wherein the wide-angle lens assembly satisfies the following condition:

$$1.5 < TTL/D_1 < 2;$$

wherein TTL is an interval from an object side surface of the first lens to an image plane along the optical axis and $D_1$ is an effective optical diameter of the first lens.

8. The wide-angle lens assembly as claimed in claim 1, wherein the wide-angle lens assembly satisfies the following condition:

$$50 \leq Vd_6 - Vd_7 \leq 70;$$

wherein $Vd_6$ is an Abbe number of the sixth lens and $Vd_7$ is an Abbe number of the seventh lens.

9. The wide-angle lens assembly as claimed in claim 1, wherein the wide-angle lens assembly satisfies the following condition:

$$135\ degrees/mm < FOV/f < 170\ degrees/mm;$$

wherein FOV is a full field of view of the wide-angle lens assembly and f is an effective focal length of the wide-angle lens assembly.

10. A wide-angle lens assembly comprising:
a first lens which is with negative refractive power and comprises a convex surface facing an object side and a concave surface facing an image side;
a second lens which is with negative refractive power and comprises a convex surface facing the object side and a concave surface facing the image side;
a third lens which is with negative refractive power and comprises a concave surface facing the object side and another concave surface facing the image side;
a fourth lens which is with positive refractive power and comprises a convex surface facing the object side and another convex surface facing the image side;
a fifth lens which is with positive refractive power and comprises a convex surface facing the object side and another convex surface facing the image side;
a stop;
a sixth lens which is with positive refractive power and comprises a convex surface facing the image side;
a seventh lens which is with negative refractive power and comprises a concave surface facing the object side;
an eighth lens which is with positive refractive power and comprises a convex surface facing the object side; and
a ninth lens which is with positive refractive power and comprises a concave surface facing the object side and a convex surface facing the image side;
wherein the wide-angle lens assembly satisfies the following condition:

$$3.3\ mm < BFL < 4\ mm;$$

wherein BFL is an interval from an image side surface of the ninth lens to an image plane along the optical axis;

wherein the first lens, the second lens, the third lens, the fourth lens, the fifth lens, the stop, the sixth lens, the seventh lens, the eighth lens, and the ninth lens are arranged in order from the object side to the image side along an optical axis.

11. The wide-angle lens assembly as claimed in claim 10, wherein:
the sixth lens further comprises another convex surface facing the object side;
the seventh lens further comprises another concave surface facing the image side;
the eighth lens further comprises another convex surface facing the image side; and
the sixth lens is cemented with the seventh lens.

12. The wide-angle lens assembly as claimed in claim 10, wherein the wide-angle lens assembly satisfies the following condition:

$$|DT| \leq 5\%;$$

wherein DT is a F-theta distortion of the wide-angle lens assembly.

13. The wide-angle lens assembly as claimed in claim 10, wherein the wide-angle lens assembly satisfies the following condition:

$$|P_{V\text{-}IR}| \leq 8 \ \mu m;$$

wherein $P_{V\text{-}IR}$ is an interval from a clearest image plane of a visible light to a clearest image plane of a infrared light along the optical axis.

14. The wide-angle lens assembly as claimed in claim 10, wherein the wide-angle lens assembly satisfies the following condition:

$$-0.7 \ mm^{-1} \leq 1/(Nd_1 \times f_1) + 1/(Nd_2 \times f_2) + 1/(Nd_3 \times f_3) + 1/(Nd_4 \times f_4) + 1/(Nd_5 \times f_5) + 1/(Nd_6 \times f_6) + 1/(Nd_7 \times f_7) + 1/(Nd_8 \times f_8) + 1/(Nd_9 \times f_9) \leq 0.7 \ mm^{-1};$$

wherein $Nd_1$ is an index of refraction of the first lens, $Nd_2$ is an index of refraction of the second lens, $Nd_3$ is an index of refraction of the third lens, $Nd_4$ is an index of refraction of the fourth lens, $Nd_5$ is an index of refraction of the fifth lens, $Nd_6$ is an index of refraction of the sixth lens, $Nd_7$ is an index of refraction of the seventh lens, $Nd_8$ is an index of refraction of the eighth lens, $Nd_9$ is an index of refraction of the ninth lens, $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, $f_6$ is an effective focal length of the sixth lens, $f_7$ is an effective focal length of the seventh lens, $f_8$ is an effective focal length of the eighth lens, and $f_9$ is an effective focal length of the ninth lens.

15. The wide-angle lens assembly as claimed in claim 10, wherein the wide-angle lens assembly satisfies the following conditions:

$$1.5 < TTL/D_1 < 2;$$

wherein TTL is an interval from an object side surface of the first lens to the image plane along the optical axis, and $D_1$ is an effective optical diameter of the first lens.

16. The wide-angle lens assembly as claimed in claim 10, wherein the wide-angle lens assembly satisfies the following condition:

$$50 \leq Vd_6 - Vd_7 \leq 70;$$

wherein $Vd_6$ is an Abbe number of the sixth lens and $Vd_7$ is an Abbe number of the seventh lens.

17. The wide-angle lens assembly as claimed in claim 10, wherein the wide-angle lens assembly satisfies the following condition:

$$135 \ degrees/mm < FOV/f < 170 \ degrees/mm;$$

wherein FOV is a full field of view of the wide-angle lens assembly and f is an effective focal length of the wide-angle lens assembly.

* * * * *